United States Patent [19]

Currin et al.

[11] 4,343,533

[45] Aug. 10, 1982

[54] SOLAR RADIATION REFLECTOR WITH A CELLULOSIC SUBSTRATE AND METHOD OF MAKING

[75] Inventors: Cedric G. Currin; Bernard Van Wert, both of Midland, Mich.

[73] Assignee: Dow Corning Corporation, Midland, Mich.

[21] Appl. No.: 221,950

[22] Filed: Dec. 31, 1980

[51] Int. Cl.$^3$ .......................... G02B 5/10; G02B 7/18
[52] U.S. Cl. .................................. 350/288; 350/296; 156/299; 156/307.1
[58] Field of Search ............... 350/288, 293, 296, 310, 350/320; 156/299, 307.1

[56] References Cited

U.S. PATENT DOCUMENTS

| | | | |
|---|---|---|---|
| 2,626,609 | 11/1953 | Friedberg | 350/292 |
| 3,463,577 | 8/1969 | Friedberg | 350/292 |
| 3,841,738 | 10/1974 | Caplan | 350/293 |
| 3,866,285 | 2/1975 | Clark | 29/157 R |
| 3,912,380 | 10/1975 | Klein | 350/310 |
| 4,124,277 | 11/1978 | Stang | 350/310 |
| 4,229,077 | 11/1980 | Schwab | 350/310 |

FOREIGN PATENT DOCUMENTS 2626039 9/1978 Fed. Rep. of Germany .

OTHER PUBLICATIONS

Bernard, R., *Solar Age*, vol. 3, No. 2, Feb. 1978, pp. 14–17.

*Primary Examiner*—Jon W. Henry
*Attorney, Agent, or Firm*—Richard E. Rakoczy

[57] ABSTRACT

This invention relates to a solar radiation reflector which can be fabricated from readily available, relatively low-cost materials with a minimum of effort and materials. The reflector consists essentially of a laminate of (A) at least one reflective metal foil layer possessing a weather-resistant protective coating on its reflective side and (B) at least one layer of cellulosic material impregnated with a weather-resistant cured polymer composition. Preferably, the metal foil is aluminum foil coated with a weather-resistant coating of silicone resin and the cellulosic material is a single layer of corrugated cardboard impregnated with a weather-resistant silicone resin composition.

10 Claims, 3 Drawing Figures

SOLAR RADIATION REFLECTOR WITH A CELLULOSIC SUBSTRATE AND METHOD OF MAKING

BACKGROUND OF THE INVENTION

This invention relates to a solar radiation reflector which is a laminate of a reflective metal foil and a polymer- or resin-impregnated cellulosic material and is useful in outdoor applications.

Solar radiation is an attractive source of economical, environmentally sound and potentially limitless source of energy. Many devices have been proposed in the past for the purpose of using solar radiation, either directly or indirectly by converting solar radiation into another form of energy, to satisfy man's needs. Optimum benefit from solar energy is obviously obtained when the devices employed to collect and use solar radiation are themselves simple, durable and economical. Cost and simplicity become major factors in areas of the world where solar energy is an abundant resource, but where the inhabitants of those areas simply cannot afford the cost of expensive devices for solar energy collection. Likewise, in more developed countries, the cost of conventional energy resources can be reduced through the use of solar radiation and thus, dependence on fossil fuels can be reduced.

Various types of simple, lightweight and economical solar energy collection devices have been proposed in the past. For example, Clark (U.S. Pat. No. 3,866,285—patented on Feb. 18, 1975) teaches a solar energy collector having a body of foamed plastic which possesses cylindrical recesses covered with a reflective or absorptive foil to reflect or transmit solar radiation to solar photocells or fluid conduits. Pauly (U.S. Pat. No. 3,993,528, patented on Nov. 23, 1976) teaches a solar furnace of a dish-shaped configuration wherein the reflector is composed of resin-impregnated fiberglass cloth having a multitude of mirror elements affixed thereto. Caplan (U.S. Pat. No. 3,841,738, patented on Oct. 15, 1974) teaches an inexpensive, lightweight, reflective panel for solar thermal collector modules. Caplan's parabolic reflector is described as a rigid, waterproof, honeycomb panel formed of paper. A reflecting material such as mirrored glass strips or metal foil is adhered to the parabolically curved side to form a reflector. Friedberg (U.S. Pat. No. 3,463,577, patented on Aug. 26, 1969 teaches a sun-reflecting board described as being a rectangular-shaped, foldable body of, preferably, relatively thick cardboard covered with a reflecting material such as aluminum paper, tin foil and the like. The purpose of the board is to reflect sunlight on the face or body of a human being. See also U.S. Pat. No. 2,626,609 (Friedberg, patented Jan. 27, 1953) for a similar type of board.

There is still a need for a low-cost, lightweight, simple and easily fabricated solar radiation reflector suitable for long-term use in outdoor applications.

SUMMARY OF THE INVENTION

It is a primary object of this invention to provide a solar radiation reflector which can be fabricated primarily from readily obtainable, relatively low-cost materials such as aluminum foil and corrugated cardboard. It is another object of the present invention to provide a solar radiation reflector which can be easily fabricated with a minimum of effort and equipment. Still another object of the present invention is to provide a solar radiation reflector which is useful in conjunction with photovoltaic cells, fluid or air thermal collectors and/or in passive solar energy building applications where long-term outdoor exposure is required.

This and other objects are provided by a solar radiation reflector which, in its simplest form, is a laminate of a reflective metal foil which is bonded to a substrate which is one or more polymer-impregnated layers of a cellulosic material, preferably corrugated cardboard, wherein the polymer, preferably a resin, is employed to both render the cellulosic material resistant to outdoor exposure and to bond the metal foil to the substrate. The reflective surface of the foil is faced away from the substrate and is provided with a weather-resistant protective coating to maintain the reflectivity of the surface. Preferably, weather-resistant silicone resins are employed as impregnants and as coatings because of their well-known superior resistance to the effects of outdoor exposure. This invention provides a solar radiation reflector which is prepared by a relatively simple and straightforward method of construction.

BRIEF DESCRIPTION OF THE DRAWINGS

The above and other objects, features and advantages of the present invention will become apparent to those skilled in the art upon an examination of the following description and accompanying drawings which are merely illustrative of the present invention.

In the drawings.

DETAILED DESCRIPTION OF THE INVENTION

Figure 1:
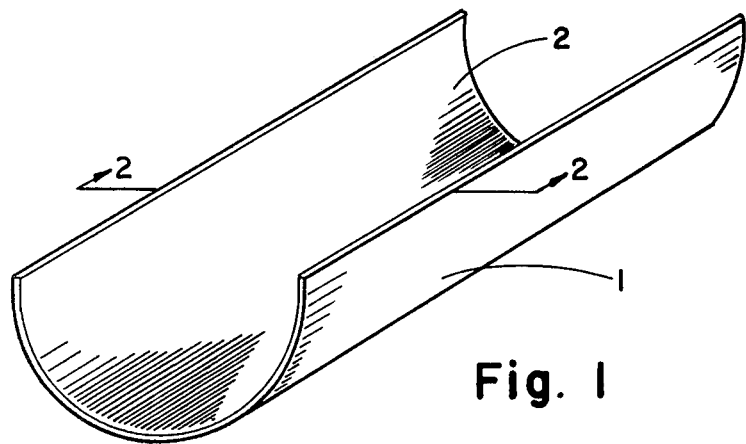
FIG. 1 is a perspective view of a solar radiation reflector of the present invention shaped into the form of a curved reflector unit.

Referring to the drawings, FIG. 1 shows one form which the solar radiation reflector of the present invention can take which is that of a curved reflector 1 which has the reflective surface 2 of the foil situated on the inside of the reflector such that solar radiation striking the reflective surface of the reflector can be directed at, for example, a heat-exchanger pipe (not shown) situated at or near the focal point of the reflector. This form of a reflector is presented only for illustrative purposes. The actual shape of the solar radiation reflector of the present invention forms no part of the present invention and can be flat, curved, dish-shaped or whatever shape that is required for the desired application. Multiple reflectors can also be used to construct one reflector unit. One of the advantages of the present invention is the fact that the laminate can readily be shaped into various configurations. The term "shaping" as used in this specification and the claims is intended to mean cutting, folding, bending, twisting or otherwise forming the desired configuration through the use of bending jigs, mandrels, cutting tools and other means which are well known to those skilled in the art of shaping sheet materials.

Figure 2:
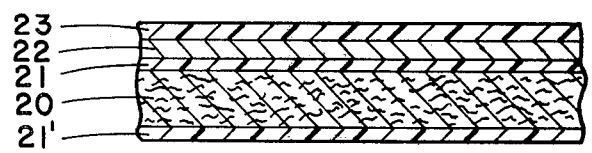
FIG. 2 is a cross-sectional view of a portion of FIG. 1 taken along section line 2—2 showing the laminated structure of the reflector.

FIG. 2 is a cross-sectional view of a portion of curved reflector 1 along section line 2—2 showing the details of the laminate which consists essentially of the solar radiation reflector of the present invention. FIG. 2 shows a substrate composed of a single layer 20 of a cellulosic material which has been impregnated with a weather-resistant cured polymer such as a resin. During the process of impregnation, resin layers 21 and 21' form at the outermost surfaces of layer 20. Resin layer 21 acts as an adhesive to bond metal foil layer 22 with layer 20 while resin layer 21' acts as a protective coating for the opposite side of layer 20. Metal foil layer 22 has a reflective surface facing away from the substrate. That reflective surface is provided with a weather-resistant protective coating 23.

Figure 3:
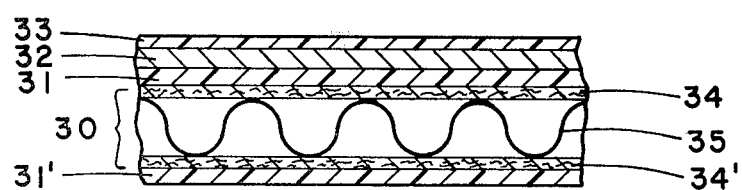
FIG. 3 is a preferred embodiment of the present invention shown as an embodiment of FIG. 2 wherein the substrate is a single layer of corrugated cardboard.

FIG. 3 shows a preferred embodiment of the present invention which is a laminate of a substrate composed of corrugated cardboard layer 30 impregnated with a weather-resistant cured resin and a metal foil layer 32. During the impregnation process, resin layers 31 and 31' form at the outermost surfaces of layer 30. Layer 31 is employed as an adhesive to bond metal foil 32 to layer 30. The metal foil layer 32 has a reflective surface which faces away from the substrate and that reflective surface is provided with a weather-resistant protective coating 33. The corrugated cardboard layer 33 is composed of two sheets of kraft paper 34 and 34' forming a sandwich structure with a corrugated sheet 35 of kraft paper adhered to the two sheets and thereby forming the core of the sandwich. Corrugated cardboard layer 30 is a preferred substrate material because it is relatively inexpensive, widely available, and among other advantages, lends structural support to the reflector which support is further improved by the presence of the cured impregnating resin. Use of corrugated cardboard can also simplify the manufacture of a solar radiation reflector because in many applications a substrate composed of a single layer of corrugated cardboard may have sufficient structural strength to suit the needs of the particular end-use.

The substrate is composed of layers of a cellulosic material such as paper, paperboard, cardboard, fiberboard and combinations of two or more thereof. The cellulosic materials chosen should be capable of absorbing the hereinafter described resin. When thin layers of paper such as writing paper are used, it is preferable to employ multiple layers or to use one or two layers of a thicker paper. Preferably, the substrate is composed of cardboard, corrugated or uncorrugated, or paperboard. For the previously noted reasons, the most preferred and best substrate is one layer of corrugated cardboard manufactured out of kraft paper of the type commonly used in constructing cardboard boxes. The corrugated cardboard can be a sandwich structure as was previously described or can be one sheet of kraft paper having a sheet of corrugated kraft paper adhered thereto if greater ease in shaping the cardboard is desired. Since these materials are well known and commonly available, no further description is believed to be necessary.

The weather-resistant polymer compositions which are useful for the purpose of impregnating the cellulosic materials forming the substrate of the reflector can be any type of curable polymer composition which can be absorbed by the cellulosic material and which will render it suitable for outdoor applications because it improves the resistance of the cellulosic material to the effects of weathering and moisture. Resins can be preferable because, in addition to improving the weatherability of the substrate, the presence of the cured resin in the cellulosic material improves the structural strength of the substrate and enables it to retain its shape during outdoor exposure. Silicone resins are presently preferred. Another advantage realized by impregnating the cellulosic material with a silicone material is that the flammability of the laminate can be reduced over that of an unimpregnated layer of cellulosic material. The polymer composition can be a room-temperature curable polymer or can be heat curable as long as the curing temperature is not high enough to cause degradation of the cellulosic material. The choice of curing mechanism and rate is governed by the requirement that the cure rate must allow one a sufficient amount of time to finish impregnating the cellulosic layers and to place the metal foil layer on the uppermost surface of the substrate while the polymer layer on the substrate is still sufficiently uncured to act as an adhesive to bond the metal foil to the substrate. For example, a heat-curable resin can be employed if multiple layers of a cellulosic material are to be used since the resin is substantially uncured until it is heated while room temperature curable resins are preferably used when only a single layer of cellulosic material is being used as a substrate. The polymer composition should contain a sufficient polymer or resin solids content to render the layers of cellulosic material suitable for outdoor applications.

Examples of such polymer compositions are heat-curable acrylic resins, room-temperature curable aliphatic epoxy resins, peroxide-cured unsaturated polyester resins, moisture-curable aliphatic polyurethane resins, emulsions containing polysiloxanes curable to silicone elastomers and silicone resins which are either room temperature curable or heat curable. These compositions can be pigmented or unpigmented and can contain small amounts of curing agents, catalysts, and other well-known additives. Due to their well-known durability in outdoor applications, weather-resistant silicone resins are preferred. One example of a specific silicone resin which can be used to impregnate the above cellulosic materials is a silicone resin containing phenylsiloxy and dimethylsiloxy units such as that which is commercially available from Dow Corning Corporation, Midland, Mich. 48640 under the name Dow Corning® 1-2577 Conformal Coating.

The metal foil layer employed in the solar radiation reflector of the present invention can be any foil having a solar radiation reflective surface such as aluminum, stainless steel, nickel, or silver. The term "metal foil" includes metallized plastic films such as an aluminum-coated polyester film. A highly reflective aluminum foil is preferred because it is readily available and has the highest solar reflectivity of non-precious metals. Only the side employed as a reflector is required to be reflective.

To preserve the reflective surface of the foil, the reflective surface is provided with a weather-resistant protective coating. The term "weather-resistant" as used here is intended to mean that the coating serves to render the reflective surface more resistant to corrosion, to air pollution, to reductions in reflectivity caused by the abrasive effects of wind-blown sand and dirt, hail and to other degradative influences on the reflective surface caused by outdoor exposure and thereby preserves the reflectivity of the surface. The coating must be sufficiently transparent to allow the solar radiation to reflect from the surface it protects. While acrylic polymer compositions or polymer compositions containing polytetrafluoroethylene can be used for this purpose, silicone resins are again preferred. Also included within the term "protective coating" is a coating of aluminum oxide of the type formed when aluminum is subjected to an anodization process. Examples of suitable protective coatings are those derived from silicone resins containing silicon-bonded methyl and phenyl groups such as those sold under the name Dow Corning® 808 Silicone Resin and Dow Corning® 1-2577 Conformal Coating by Dow Corning Corporation and also, when aluminum foil is used, the highly abrasion- and corrosion-resistant colloidal silica-containing silicone resin compositions taught by Clark in U.S. Pat. No. 3,986,977 (patented Oct. 19, 1976) which are available from Dow Corning Corporation under the Trademark "Vestar ™". More preferably, one type of weather-resistant silicone resin can be employed to protect the reflective surface and also to serve as an impregnating resin for the cellulosic material layers.

To further aid others in the practice of the present invention, the method of making a solar radiation reflector of the present invention will now be described.

First, a layer of a cellulosic material of the type described above, preferably a sheet of corrugated cardboard, is formed into the shape of a solar radiation reflector substrate such as the curved reflector shown in FIG. 1 by cutting it to the desired size and bending the sheet across a mandrel. The shaped layer is then impregnated by immersing it in a dip tank containing an impregnating polymer composition of the type described above, preferably a silicone resin composition, which contains a sufficient polymer solids content to render the layer suitable for use in outdoor applications after the composition is cured. The polymer composition employed may require reduction with an appropriate solvent or solvents if the viscosity of the composition as supplied is too high to allow adequate drainage of the composition from the layer after impregnation, provided that the solids content is not reduced below the above required solids content. To speed the impregnation process, a vacuum can be maintained over the area of the dip tank to remove some of the air bubbles from the layer as it is soaking in the dip tank. The forming and impregnating steps can then be repeated for each additional layer that one wishes to use to prepare the substrate. In the event that multiple layers are used, when the impregnation steps are completed for all of the layers, the shaped layers are then pressed together while the resin is still in an uncured state to form a single solar radiation reflector substrate. Preferably, one layer of a corrugated cardboard is employed as the substrate. This substrate will generally have two "outermost" surfaces which are large enough in area to be of significant value as a reflective surface since the other sides of the laminate will be relatively narrow and thin unless the thickness of the substrate is rather large. Therefore, the term "outermost" surface will, for the purposes of the present invention, mean one of the larger substrate surfaces such as is shown as reference numeral 2 in FIG. 1.

Preferably, the reflective metal foil employed is an aluminum metal foil having a shiny reflective surface on one side of the foil. The metal foil is then combined, shiny side out, with one of the outermost surfaces of the substrate while the resin employed to impregnate the cellulosic material layers is still in an uncured state. A layer of uncured resin is generally left on the substrate by the impregnation process and the metal foil, reflective surface situated away from the substrate, is pressed onto the substrate to contact this resin layer which layer serves as an adhesive to bond the foil to the substrate.

An alternative, and possibly better, method for combining the foil with the substrate is to place the foil, reflective surface away from the substrate, over a smooth polished mold surface having a shape which will result in the reflector shape that is desired (e.g. a convex mold surface to produce a concave reflector surface) and then placing the impregnated layer against the foil to produce a more optically perfect reflector surface. If desired, one or more or all of the other surfaces of the substrate can be covered with metal foil in the same manner, although one foil surface is preferred because that is the most economical in terms of material costs since the other sides of the substrate are protected by the resin. The resin composition is then allowed to cure to result in the formation of a laminate of the metal foil and the resin-impregnated substrate.

Finally, the reflective surface of the foil is provided with a weather-resistant clear protective coating, preferably a curable silicone resin coating. The coating composition can be sprayed or flow coated onto the reflective surface. In the event that an aluminum foil with an anodized reflective surface is used, no further coating of the reflective surface may be required.

A flat solar radiation reflector of the present invention was prepared in accordance with the above-described method using a single 4"×4" (" denotes inches) sheet of ¼" thick corrugated cardboard and a sheet of a commercially obtained aluminum foil having a reflective surface on one side of the foil. The cardboard was impregnated with Dow Corning® X1-2577 Silicone Resin (80% resin solids content) as supplied by the manufacturer and after the foil was placed over the resin-impregnated cardboard, the resin was cured 24 hours at room temperature (about 70° F.). After the resin was cured, a coating of Dow Corning® 808 Silicone Resin (catalyzed with 0.1 part of Dow Corning® 21 Paint Additive per 100 parts of resin to render the resin curable at room temperature) was sprayed on the reflective surface of the aluminum foil and allowed to cure at room temperature for 24 hours to provide a weather-resistant protective coating for the reflective surface of the reflector. The total reflectivity over the solar spectrum of this reflector was measured with a Gier-Dunkele Solar Reflectometer which employs a xenon lamp to simulate solar radiation and was found to be 79%. One commercially available reflective aluminum sheet having an anodized reflective surface is sold under the trademark Alzak® by the Aluminum Company of America and reportedly has a total reflectivity over the solar spectrum of 85%. The 79% value obtained with the above reflector of the present invention compares favorably with the value of the Alzak® material.

Because the present invention is concerned with solar radiation reflectors which are intended to be used outdoors for long periods of time, the following comparison demonstration was made to show the effect of moisture on the cellulosic substrate material. Sample A was a solar radiation reflector prepared as described above and Sample B was a sheet of the same cardboard used to prepare Sample A, but was not impregnated with any type of weather-resistant polymer composition. Sample A and Sample B were placed in a humidity cabinet for 500 hours at room temperature (about 70° F.) and at 100% relative humidity. Sample A remained structurally sound after 500 hours exposure and was found to have absorbed 7.0% water as measured by weighing the sample before and after the exposure. The percentage increase in weight was taken to be the percentage of water absorbed by the Sample A. Sample B disintegrated. Thus, the substrate must be impregnated to resist the effects of exposure to moisture.

The above examples are merely illustrative and are not to be construed as limiting the scope of the present invention, which is properly defined by the appended claims.

The present invention provides a solar radiation reflector which can be used as part of a solar energy collecting device or in passive solar energy applications. One example of the latter is where the solar radiation reflector is used in the form of or as part of a flat roofing shingle or roofing module which is used to reduce the cooling requirements of a building by reflecting solar radiation away from the roof of the building or is employed as a reflective shingle or module to direct solar radiation through the windows of a building to heat the interior of the building.

The term "consisting essentially of" as used in the claims is intended to mean that minor amounts of other additives which do not affect the reflective properties of the reflector to a significant degree such as adhesion promoters applied to the surface of the metal foil, pigments added to the substrate layers, flame retardants and the like can be added to some portion of the laminate without deviating from the scope of the present invention and are included by such a term. Likewise, the term applies to an article such as a roofing tile or module wherein the above-described reflector is attached to another substrate by some means wherein the substrate merely aids in affixing the tile or module to the roof in a manner which enables the reflector to perform its stated function of reflecting solar radiation.

Other modifications and variations of the solar radiation reflector of the present invention will become apparent to those skilled in the art from an examination of the above specification and drawings. Therefore, other variations of the present invention may be made which fall within the scope of the appended claims even though such variations were not specifically discussed above.

That which is claimed is:

1. As an article of manufacture, a solar radiation reflector consisting essentially of a laminate of
    (A) at least one layer of a metal foil possessing a solar radiation reflective surface located on the outermost surface of
    (B) a substrate composed of at least one layer of a cellulosic material selected from the group consisting of paper, paperboard, cardboard, fiberboard and combinations of two or more thereof,
    the reflective surface of said foil being coated with a weather-resistant protective coating and being faced away from the substrate, said (B) being impregnated with a sufficient amount of a weather-resistant cured polymer composition to render the cellulosic material suitable for use in outdoor applications, said impregnating polymer composition also serving as an adhesive to bond said foil to the substrate layer.

2. The article as claimed in claim 1 wherein the weather-resistant cured polymer composition is a cured resin and the weather-resistant protective coating is a protective coating of resin.

3. The article as claimed in claim 2 wherein the resins employed to protect said (A) and to impregnate said (B) are silicone resins.

4. The article as claimed in claim 3 which contains only one layer of metal foil and wherein the metal foil is aluminum foil.

5. The article as claimed in claims 3 or 4 wherein said substrate is composed of one layer of said cellulosic material.

6. The article as claimed in claim 5 wherein said cellulosic material is a corrugated cardboard material.

7. The article as claimed in claim 1 wherein the metal foil is aluminum foil and the weather-resistant protective coating on the reflective surface of the foil is produced by an anodization process.

8. A method of making a solar radiation reflector consisting essentially of the steps of
    (A) Forming a layer of a cellulosic material selected from the group consisting of paper, paperboard, cardboard and fiberboard into the shape of a solar radiation reflector substrate through the use of a suitable shaping means,
    (B) Impregnating the shaped layer of (A) with a silicone resin composition curable to a weather-resistant product, said resin composition containing a sufficient resin solids content to render the layer suitable for use in outdoor applications after the composition is cured,
    (C) Repeating steps (A) and (B) if more than one layer is to be used to form said substrate and thereafter pressing the shaped, resin-impregnated layers together while the resin is still in an uncured state to form a single solar radiation reflector substrate,
    (D) Combining at least one layer of metal foil possessing a solar radiation reflective surface with at least one of the outermost surfaces of said substrate while the substrate still contains a layer of uncured resin thereon such that the uncured resin layer is placed in contact with the foil, the reflective surface of the foil being faced away from the substrate,
    (E) Curing the resin to form a laminate of said metal foil and cured resin-impregnated substrate, and
    (F) Providing the reflective surface of said foil with a weather-resistant protective coating.

9. The method as claimed in claim 8 wherein said reflector contains a single layer of metal foil, said foil being aluminum foil.

10. The method as claimed in claim 9 wherein the substrate is a single layer of a cellulosic material, said cellulosic material being a corrugated cardboard material.

* * * * *